United States Patent [19]

Huhta-Koivisto

[11] Patent Number: 4,536,258

[45] Date of Patent: * Aug. 20, 1985

[54] DISTILLING APPARATUS OPERATING ON THE THERMOCOMPRESSOR PRINCIPLE

[75] Inventor: Esko Huhta-Koivisto, Espoo, Finland

[73] Assignee: Oy Finn-Aqua Ltd., Finland

[*] Notice: The portion of the term of this patent subsequent to Dec. 20, 2000 has been disclaimed.

[21] Appl. No.: 611,878

[22] Filed: May 18, 1984

[30] Foreign Application Priority Data

May 20, 1983 [FI] Finland ............................. 831797

[51] Int. Cl.³ .................. B01D 1/06; B01D 1/28; B01D 3/04

[52] U.S. Cl. .................................... 202/180; 202/187; 202/197; 202/237; 203/26; 159/24.3; 159/27.1; 159/46

[58] Field of Search ............... 202/180, 181, 187, 197, 202/237, 176, 182, 185 R, 235; 203/26, 25, 40, DIG. 4, DIG. 8; 159/24 B, 28 R, 27 R, 46

[56] References Cited

U.S. PATENT DOCUMENTS

| | | | |
|---|---|---|---|
| 1,958,547 | 5/1934 | Payne et al. | 159/28 R |
| 2,449,587 | 9/1948 | Chambers | 202/180 |
| 3,236,748 | 2/1966 | Pottharst, Jr. | 203/26 |
| 3,444,049 | 5/1969 | Starmer et al. | 202/237 |
| 3,575,814 | 4/1971 | Bahrenburg | 202/197 |
| 3,997,408 | 12/1976 | Barba et al. | 203/26 |
| 4,304,637 | 12/1981 | Robbins | 202/235 |
| 4,421,605 | 12/1983 | Huhta-Koivisto | 202/197 |

FOREIGN PATENT DOCUMENTS 0149737  4/1955  Sweden ..................... 159/27 R

Primary Examiner—Wilbur Bascomb
Assistant Examiner—Virginia Manoharan
Attorney, Agent, or Firm—Steinberg & Raskin

[57] ABSTRACT

Distillation apparatus is disclosed which operates according to the so-called thermocompressor principle and which incorporates tubular means disposed within the apparatus to define an inner conduit and an outer annular flow duct, means for dividing the outer annular flow duct into an upper portion and a lower portion, and aperture means provided in one of these portions of the divided annular flow duct. Energy imparting means, preferably blower means, is disposed within the housing of the apparatus such that after a fluid stream, composed of at least one of liquid to be distilled and vapor, flows through at least one heat exchange tube within the apparatus and through the inner conduit, vapor flows through the energy imparting means which conveys the same into one of the two portions of the divided annular flow duct, whereby the vapor discharges from the annular flow duct to be condensed.

16 Claims, 1 Drawing Figure

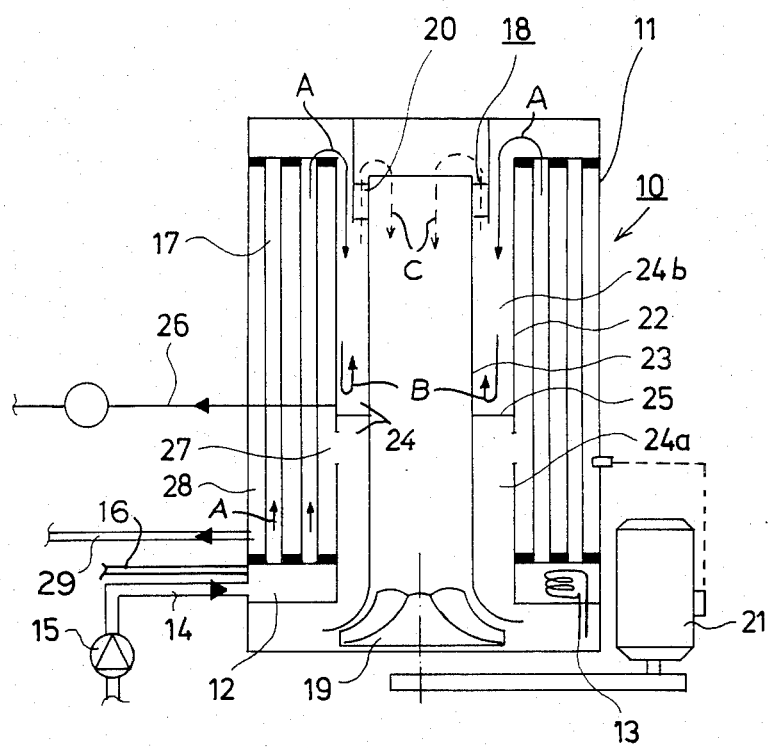

DISTILLING APPARATUS OPERATING ON THE THERMOCOMPRESSOR PRINCIPLE

BACKGROUND OF THE INVENTION

The present invention relates generally to distillation apparatus which utilizes or operates according to the so-called thermocompressor principle. More particularly, the present invention is directed to an improvement within such distillation apparatus.

Distillation apparatus which operate according to the so-called thermocompressor principle are known and generally comprise a housing in which a boiling chamber for accommodating the liquid to be distilled is situated, heating means for heating the liquid in the boiling chamber, feed line means for conducting liquid to be distilled into the boiling chamber, output line means for removing distillate from the distillation apparatus, and means for imparting additional energy to the vapor produced from the liquid in the boiling chamber such that the temperature of the vapor at the output side of the apparatus is increased. At least one heat exchange tube along which a mixture composed of liquid to be distilled and vapor flows, and a droplet separator based on centrifugal separation, are also provided within such distillation apparatus.

Conventional distillation apparatus utilizing the so-called thermocompressor principle generally operate as follows. The liquid to be distilled is heated in the boiling chamber whereupon it evaporates with the vapor moving into the upper portion of the boiling chamber and having a temperature of about 96° C. The vapor so produced is drawn from the upper portion of the boiling chamber into a compressor which imparts additional energy thereto whereupon the temperature of the vapor increases at the output or delivery side of the compressor to about 105° C. The vapor (e.g. steam) at the increased temperature is then conducted into a helical tube through the boiling chamber whereupon the vapor condenses into distillate whereupon the distillate is removed from the distillation apparatus. The condensing vapor naturally releases at least a portion of its heat energy to the liquid to be distilled accommodated within the boiling chamber.

Although such conventional distillation apparatus which operate according to the thermocompressor principle described above have the advantage of relatively low energy consumption, e.g., about 4 kw per 100 liters/hour of liquid to be distilled, certain disadvantages are also inherent in such operation. The greatest drawback of such conventional apparatus is the admittance of impurities into the evaporated distillate falling through the compressor which of course prevents an absolutely pure distillate from being obtained. Moreover, such distillation apparatus of the prior art are exceedingly massive and bulky and create objectionably high noise levels during operation.

Improvements have been made in the conventional distillation apparatus which operate according to the thermocompressor principle as described above in that the temperature of the vapor produced in the upper regions of the boiling chamber is higher than 100° C., usually about 105° C., whereby the pressure in the boiling chamber will exceed atmospheric pressure. As a result thereof, the temperature of the vapor will increase to about 120° C. at the output side of the compressor. However, in other respects, the various advantages and disadvantages of the improved distillation apparatus are the same as those discussed above in connection with the conventional distillation apparatus.

Also known in the art is distillation apparatus which operates in accordance with the thermocompressor principle and wherein the temperature of the vapor produced from the liquid to be distilled is increased utilizing a heat pump. In this arrangement two separate heat exchangers are utilized, one heat exchanger being situated in the upper region of the boiling chamber while the other heat exchanger is situated in the lower region of the boiling chamber. However, this arrangement is expensive in manufacture and requires a complex control mechanism for its operation.

U.S. Pat. No. 4,421,605, issued Dec. 20, 1983, also discloses a distillation apparatus operating on the thermocompressor principle including a housing in which a boiling chamber for accommodating the liquid to be distilled is situated, means for heating the liquid within the boiling chamber, feed line means for conducting liquid to be distilled into the boiling chamber, output line means for removing distillate from the distillation apparatus, and means for imparting additional energy to the vapor produced from the liquid within the boiling chamber, so that the temperature of the vapor at the output side of the apparatus is increased. In order to obtain distilling apparatus operating on the thermocompressor principle with simplified control technology, requiring little fluid volume, providing for quick initial heating of liquid to be distilled, providing for efficient droplet separation from vapor, producing distillate of excellent quality and purity, and consuming little energy and being small in size and simple in construction, at least one heat exchange tube along which a fluid composed of liquid to be distilled and vapor is arranged to flow, and a droplet separator based on dynamic centrifugal separation are both provided within the distillation apparatus. The droplet separator is situated within the distillation apparatus in a manner to define a gush or overflow gap between the same and a wall of the boiling chamber through which the mixture of liquid to be distilled and of vapor is adapted to flow after the mixture has discharged from the heat exchange tube.

After the mixture of the liquid to be distilled and the vapor is discharged from the heat exchange tube and has flowed through the gush or overflow gap with the vapor having flowed through the droplet separator, the vapor is then directed into the means for imparting additional energy to the vapor. According to a feature of the apparatus disclosed in U.S. Pat. No. 4,421,605, the additional energy imparting means is constituted by blower means situated within the distillation apparatus, and the droplet separator is provided with helical vanes and is connected to a lower face of the blower means. Waste pipe means are provided through which a portion of the liquid to be distilled is discharged from the boiling chamber in a continuous manner to stabilize the level of liquid within the boiling chamber. Also, the heat exchange tube extends through a vapor condensation chamber and is situated around the boiling chamber, with heating means, by which the liquid to be distilled is heated within the boiling chamber, being situated below the heat exchange tube. Drive means for the blower means is a motor with a short-circuited rotor that is fitted to drive the blower means by magnetic transmission through an end wall of the distillation apparatus.

Although excellent in structure and in operation, the distilling apparatus of U.S. Pat. No. 4,421,605 is still encumbered by certain drawbacks. Initially, the return flow of vapor from the compressor to the condensor is unsatisfactory, since vapor has to be directed in a complicated manner through "water wells". It is also necessary to circulate the effluent, with the result that the structure of the distilling apparatus becomes contaminated. Moreover, the blower means which imparts additional energy to the vapor has been disposed at the upper end of the distillation apparatus in U.S. Pat. No. 4,421,605, which results in a comparatively massive structure and inconvenient, difficult maintenance.

SUMMARY OF THE INVENTION

Accordingly, it is an object of the present invention to provide new and improved distillation apparatus which operate according to the thermocompressor principle and which eliminates the drawbacks of conventional distillation apparatus of the type discussed above.

It is also an object of the present invention to improve flow of purified vapor and subsequent condensation thereof to distillate, in a distillation apparatus.

It is another object of the present invention to avoid contamination of purified vapor generated in a distillation apparatus and to avoid contamination of the various components of the distillation apparatus itself.

It is a further object of the present invention to facilitate construction and maintenance of a distillation apparatus.

It is a still further object of the present invention to increase energy efficiency in a distilling operation.

It is still another object of the present invention to decrease the noise level in a distilling operation.

Briefly, in accordance with the present invention, these objects as well as others are attained by providing distillation apparatus which operates according to the thermocompressor principle and which incorporates tubular means disposed within the apparatus to define an inner conduit and an outer annular flow duct, means for dividing the outer annular flow duct into an upper portion and a lower portion, and aperture means provided in one of the two portions of the divided annular flow duct. Energy imparting means, preferably blower means, is disposed within the housing of the apparatus such that after a fluid stream, composed of at least one of liquid to be distilled and vapor, flows through at least one heat exchange tube within the apparatus and through the inner conduit, vapor flows through the energy imparting means which conveys the same into one of the two portions of the divided annular flow duct, whereby the vapor discharges from the annular flow duct to be condensed.

According to a feature of the present invention, the tubular means and dividing means are disposed within the housing of the distillation apparatus, such that the fluid stream comprising at least one of the liquid to be distilled and the vapor flows through from the heat exchange tube into the upper portion of the divided annular flow duct, and then into the inner conduit. The aperture means is disposed in the lower portion of the divided annular flow duct, so that vapor flows from the inner conduit through the energy imparting means, through the lower portion of the divided annular flow duct, and out the aperture means for condensing.

According to another feature of the present invention, droplet separating means is disposed within the upper portion of the divided annular flow duct, such that substantially only vapor of the flowing fluid stream is conveyed into the inner conduit, and liquid separated out therefrom accumulates in the upper portion of the divided annular flow duct. A discharge connector is disposed within the housing of the distillation apparatus and connected with this upper portion of the divided annular flow duct for removing effluent liquid therefrom. The droplet separation means may be of the centrifugal type, and may be constituted by a droplet separator having helical vanes. Blower means which may constitute the energy imparting means, may be disposed at the bottom of the inner conduit and adjacent to the lower portion of the annular flow duct.

In the illustrated embodiment of the present invention, the inner conduit is disposed substantially at the center of the distillation apparatus, while the dividing means is disposed within the annular flow duct to divide the same into a longer upper portion and a shorter lower portion. Means for condensing the vapor may be provided within the housing of the distillation apparatus adjacent the aperture means so that vapor to be condensed flows through the aperture and into the condensing means which may be disposed adjacent the at least one heat exchange tube such that vapor condensing therewithin imparts heat to the fluid stream flowing through the heat exchange tube.

The terms "upper" and "lower" as used herein refer to relative positions with respect to one another. In other words, the distillation apparatus of the present invention may be disposed either substantially vertically, or even substantially horizontally, with the terms "upper" and "lower" referring to the relative positions of the two portions of the divided annular flow duct with respect to one another. Therefore, the terms "upper" and "lower" are not to be construed as limiting the overall orientation of the distillation apparatus of the present invention. By the same token, aperture means may be provided in the upper portion of the divided annular flow duct, such that the fluid stream initially flows into the lower portion thereof, through the inner conduit and energy imparting means, and then into the upper portion of the divided annular flow duct and out through the aperture means for condensing.

Distillation apparatus constructed in accordance with the present invention provides numerous significant advantages. For example, in the distillation apparatus of the present invention, vapor can be returned from the compressor to the condensor without having to be conducted in a complicated manner through "water wells". Moreover, the effluent discharge connector may be disposed inside the tubular means, notably within the upper portion of the divided annular flow duct, so that effluent does not give rise to a contaminated circulation of fluid through the distillation apparatus. Considerably improved maintenance and a much lighter construction of the distillation apparatus can be achieved by disposing the energy imparting means in a lower part of the distillation apparatus, e.g. adjacent the lower portion of the divided annular flow duct. The distillation apparatus of the present invention requires an exceedingly small volume of water and the initial rate at which the liquid to be distilled is heated is quite rapid. The heat lost during operation of the apparatus is essentially returned to and utilized in the apparatus.

An efficient droplet separation is obtained by the dynamic centrifugal droplet separator in accordance with the invention and the apparatus as a whole is quite compact in size and simple in construction as well as in control techniques. Furthermore, the noise levels generated by the operation of the apparatus are quite low. All of these advantages are obtained with only low energy consumption requirements.

BRIEF DESCRIPTION OF THE DRAWINGS

A more complete appreciation of the present invention and many of the attendant advantages thereof will be readily understood by reference to the following detailed description, to which the present invention is not intended to be exclusively limited, in connection with the accompanying drawing in which:

The FIGURE is a schematic side elevation view in partial section of a preferred embodiment of the distillation apparatus of the present invention.

DETAILED DESCRIPTION OF A PREFERRED EMBODIMENT

Referring to the drawing, the distillation apparatus of the present invention, generally designated 10, comprises a housing 11 in which a boiling chamber 12 defined by an inner wall is situated. The boiling chamber 12, accommodates the liquid to be distilled which is supplied thereto by means of a feed line 14 and pump 15. Heating means, such as, e.g. an electric heating coil 13, are provided to heat the liquid to be distilled in the boiling chamber 12.

Moreover, a waste pipe 16 extends within the boiling chamber 12 and communicates with the external environment. The upper end of the waste pipe 16 is situated at a selected level so that a part of the liquid to be distilled will escape therethrough in a continuous flow as additional liquid is supplied through the feed line means 14 so that in this manner, the waste pipe 16 functions as an efficient and simple stabilizer for the level of the liquid to be distilled within the boiling chamber 12. According to the present invention, heat exchange tubes 17 are provided as part of the distillation apparatus 10. The heat exchange tubes 17 are arranged such that a mixture of the liquid to be distilled and of the vapor produced therefrom will flow upwardly therethrough. Heating means 13 is so disposed below the heat exchange tube 17 that the mixture formed by the heated liquid being distilled and of the vapor produced therefrom begins to flow along the heat exchange tubes 17 as a fluid stream, as indicated by the arrows "A" in the FIGURE.

A droplet separator 20, preferably of the dynamic centrifugal separation type and provided with helical vanes 20, is disposed within the distillation apparatus as described below. Blower means 19 is provided in the lower region of the distillation apparatus and driven by drive means 21.

In accordance with the fundamental concepts of the present invention, tubular means 22 is centrally disposed within the distillation apparatus to form an inner conduit 23 and an outer, annular flow duct 24 between an outer wall of tubular means 22 and the inner conduit 23. The annular flow duct 24 is partitioned by dividing means 25 into an upper portion 24b and a lower portion 24a. In the illustrated embodiment, dividing means 25 is disposed at a point below the midpoint of the longitudinal length of the annular flow duct 24, i.e. dividing means 25 partitions annular flow duct 24 such that the upper portion 24b is longer than the lower portion 24a. However, the dividing means 25 may be disposed at any convenient location along the length of annular flow duct 24 in order to partition the same.

Droplet separator 18 is disposed in the upper portion 24b of the annular flow duct 24. This droplet separator 18 may be of similar design to the droplet separator disclosed in U.S. Pat. No. 4,421,605. An effluent discharge connector 26 is also disposed in the upper portion 24b of the annular flow duct 24, while annular discharge aperture means 27 has been formed in a wall of the lower portion 24a of the annular flow duct 24 as illustrated in the FIGURE.

Condensing means 28 is provided on the other side of the discharge aperture means 27 from the lower portion 24a of the annular flow duct 24, so that vapor flowing through aperture means 27 will be condensed. A tubular connector 29 is also provided in communication with condensing means 28, e.g. a condensing space as illustrated in the FIGURE, so that vapor condensed therein is withdrawn as distillate from the condensing space 28 through tubular connector 29. Condensing means 28 and heat exchange tubes 17 may be disposed adjacent one another so that heat released by vapor condensing within the condensing means 28 is imparted to the fluid stream flowing through the heat exchange tubes 17 to heat and evaporate the same. As illustrated in the FIGURE for example, the heat exchange tubes 17 are disposed within the condensing space, to enhance this heat exchange action, to recover and efficiently utilize the heat released by condensation of the vapor.

In operation, liquid to be distilled is heated within boiling chamber 12 by the heating means 13, so that a mixture of heated liquid and of vapor formed therefrom rises upwardly in the heat exchange tubes 17 as indicated by arrows A. A mixture of vapor and of liquid droplets flow downwardly from the top of the heat exchange tubes 17 through one end of the upper portion 24b of the annular flow duct 24 (as also indicated by the arrows A), and up into the droplet separator 18 disposed in the upper portion 24b of the annular flow duct 24, in the manner indicated by the arrows B in the FIGURE. The liquid droplets separated out by the droplet separator 18 fall to the bottom of the upper portion 24b of the annular flow duct 24 (i.e. on top of dividing means 25), where accumulated liquid is then removed through effluent discharge connector 26. Thus, circulation of effluent water through the distillation apparatus which is conducive to contamination, is successfully avoided by the present invention.

Purified vapor flows out from the top of the droplet separator 18 and downwardly into the inner conduit 23, as indicated by arrows C in the FIGURE. The vapor continues flowing downwardly through the inner conduit 23 where it reaches the blower means 19. The blower means 19 imparts additional energy to the vapor and directs the same through diffusion means into the lower portion 24a of the annular flow duct 24, below the dividing means 25. The vapor discharges from the lower portion 24a of the annular flow duct 24 through discharge aperture means 27 and into condensing means 28, where the vapor concomitantly condenses, releasing heat which is imparted to the fluid stream flowing upwardly through heat exchange tubes 17 as illustrated in the FIGURE.

Thus concerning the flow of vapor, the improvement of the present invention may be termed a "once-through distillation system", enabling the vapor to be returned from the compressor to the condensor without having to pass through "water wells". Moreover, where the blower means 19 is disposed in a lower portion of the distillation apparatus 10 as illustrated in the FIGURE, better maintenance and an overall lighter construction of the distillation apparatus are attained, than if the blower means 19 is disposed in an upper portion of the distillation apparatus 10 as in U.S. Pat. No. 4,421,605.

The liquid to be distilled is heated within the boiling space 12 to a certain temperature, e.g. to about 90° C. in the case of water. The temperature and pressure of the vapor acted upon by the blower means 19 will naturally increase. For example, the temperature of the vapor, in the case of water, will increase from about 95° C. to about 105° C. The vapor at increased temperature then flows into the condensing space 28, where, as noted above, the vapor then condenses to distillate in contact with the heat exchange pipes or tubes 17, thus releasing its heat energy, i.e. the heat of condensation, to the fluid being distilled and flowing upwardly through heat exchange pipes or tubes 17. The distillate is then withdrawn from the condensing space through tubular connector 29, as noted above.

It will be understood that the liquid to be distilled may naturally be heated in the boiling chamber 12 to a higher temperature, e.g. to about 100° C. In this case, the temperature of the vapor discharging from the blower means 19 will be about 120° C. It is particularly noted that the mixture composed of the liquid to be distilled and of the vapor which flows through the heat exchange tubes 17 will have a very high flow velocity, such as on the order of about 20 meters per second. Thus, the flow velocity of the vapor passing through the helical vane droplet separator 18 will have a corresponding velocity of about 30 meters per second.

Clearly, numerous modifications and variations of the present invention are possible in light of the above teachings. It is therefore to be understood that within the scope of the claims appended hereto, the invention may be practiced otherwise than as specifically disclosed herein.

What is claimed is:

1. In a distilling apparatus for operation according to the thermocompressor principle, including a housing, a boiling chamber at least partially defined by a wall situated within the housing and adapted to contain the liquid to be distilled, means for heating the liquid to be distilled contained in the boiling chamber to produce a vapor, feed line means for conducting liquid to be distilled into the boiling chamber, means for imparting additional energy to the vapor produced in the boiling chamber having an inlet side to which the vapor formed in the boiling chamber is directed and an outlet side from which the vapor is discharged at an increased temperature, distillate removal line means for withdrawing distillate from the distilling apparatus, at least one heat exchange tube provided within the housing of the distilling apparatus and arranged such that a fluid stream composed of at least one of liquid to be distilled and vapor flows therethrough, and droplet separation means provided within the housing, the improvement comprising
tubular means disposed within the apparatus to define an inner conduit and an outer annular flow duct,
means for dividing said outer annular flow duct into an upper portion and a lower portion,
aperture means provided in one of said two portions of said annular flow duct, and
said energy imparting means being disposed within said housing such that after the fluid stream flows through the at least one heat exchange tube and through said inner conduit, vapor flows through said energy imparting means which conveys the same into one of said two portions of said annular flow duct, whereby the vapor discharges from the same to be condensed.

2. The combination of claim 1, wherein said tubular means and dividing means are disposed within the housing such that the fluid stream flows from the at least one heat exchange tube into said upper portion of said annular flow duct and then into said inner conduit, and
said aperture means is disposed in said lower portion of said annular flow duct such that the vapor flows therethrough from said energy imparting means and out through said aperture means for condensing.

3. The combination of claim 2 further including means for condensing vapor which is disposed within said housing adjacent said aperture means such that the vapor to be condensed flows therethrough and into said condensing means.

4. The combination of claim 3 wherein said condensing means and the at least one heat exchange tube are disposed adjacent one another within the housing such that the vapor condensing therewithin imparts heat to the fluid flowing through the at least one heat exchange tube.

5. The combination of claim 2 further including a discharge connector disposed within the housing and connected with said upper portion of said annular flow duct, for removing effluent liquid.

6. The combination of claim 5, wherein said droplet separating means is disposed within said upper portion of said annular flow duct such that substantially only vapor of the flowing fluid stream is conveyed into said inner flow conduit, and liquid separated out therefrom accumulates in said upper portion of said annular flow duct.

7. The combination of claim 6, wherein said droplet separation means is of the centrifugal type.

8. The combination of claim 7, wherein said droplet separation means is constituted by a droplet separator having helical vanes.

9. The combination of claim 2, wherein said energy imparting means is constituted by blower means disposed at the bottom of said inner conduit and adjacent said lower portion of said annular flow duct.

10. The combination of claim 2, wherein said dividing means is disposed within said annular flow duct to divide the same into a longer upper portion and a shorter lower portion.

11. The combination of claim 2, wherein said inner conduit is disposed substantially at the center of the distilling apparatus.

12. Distillation apparatus for operation according to the thermocompressor principle, comprising:
a housing,
a boiling chamber situated within said housing and adapted to contain the liquid to be distilled,
a droplet separator having an inlet and an outlet,
energy imparting means situated in fluid communication with the outlet of said droplet separator,
at least one heat exchange tube having an inlet communicating with said boiling chamber,
tubular means disposed within said apparatus to define an inner flow conduit and an outer annular flow duct, means for dividing said outer annular flow duct into an upper portion and a lower portion, said droplet separator disposed in said upper portion which is in communication with an outlet of said at least one heat exchange tube, and said upper and lower portions in communication with said inner flow conduit, and means for condensing vapor disposed within the housing and in communication with said lower portion of said outer annular flow duct, whereby a fluid stream comprising at least one of liquid to be distilled and vapor flows through said at least one heat exchange tube, through said upper portion of said duct and into said droplet separator with vapor and liquid being separated therein, and vapor flows through said inner flow conduit and through said blower means which conveys the same into said lower portion of said annular flow duct, and into said condensing means in communication therewith.

13. The combination of claim 12, wherein said energy imparting means is constituted by blower means disposed at the bottom of said inner conduit and adjacent said lower portion of said annular flow duct.

14. The combination of claim 12 further including a discharge connector disposed within said housing and connected with said upper portion of said annular flow duct for removing effluent liquid.

15. The combination of claim 12, wherein said inner conduit is disposed substantially at the center of the distilling apparatus.

16. The combination of claim 12, wherein said condensing means and said at least one heat exchange tube are disposed adjacent one another within said housing such that vapor condensing therewithin imparts heat to the fluid flowing through said at least one heat exchange tube.

* * * * *